US008843170B2

(12) United States Patent
Barberis et al.

(10) Patent No.: US 8,843,170 B2
(45) Date of Patent: Sep. 23, 2014

(54) CHARACTERIZATION OF CO-CHANNEL INTERFERENCE IN A WIRELESS COMMUNICATION SYSTEM, IN PARTICULAR A CELLULAR RADIO COMMUNICATION SYSTEM

(75) Inventors: Sergio Barberis, Turin (IT); Paolo Priotti, Turin (IT)

(73) Assignee: Telecom Italia S.p.A., Milan (IT)

( * ) Notice: Subject to any disclaimer, the term of this patent is extended or adjusted under 35 U.S.C. 154(b) by 252 days.

(21) Appl. No.: 12/449,438

(22) PCT Filed: Oct. 3, 2007

(86) PCT No.: PCT/IT2007/000695
§ 371 (c)(1),
(2), (4) Date: Aug. 7, 2009

(87) PCT Pub. No.: WO2008/096383
PCT Pub. Date: Aug. 14, 2008

(65) Prior Publication Data
US 2010/0159841 A1 Jun. 24, 2010

(30) Foreign Application Priority Data

Feb. 9, 2007 (WO) .................. PCT/EP2007/051302

(51) Int. Cl.
| | |
|---|---|
| *H04B 7/00* | (2006.01) |
| *H04B 7/185* | (2006.01) |
| *H04B 7/216* | (2006.01) |
| *H04B 17/00* | (2006.01) |
| *H04L 27/26* | (2006.01) |
| *H04W 24/00* | (2009.01) |
| *H04W 28/04* | (2009.01) |

(52) U.S. Cl.
CPC .......... *H04B 17/005* (2013.01); *H04B 17/0067* (2013.01); *H04L 27/2602* (2013.01); *H04W 24/00* (2013.01); *H04W 28/04* (2013.01)
USPC ............................ 455/522; 370/318; 370/342

(58) Field of Classification Search
USPC ............. 455/63.1, 452.2, 522, 501, 450, 436, 455/67.13, 431, 435.2, 453.403; 370/329, 370/328, 335, 338, 342, 337, 462
See application file for complete search history.

(56) References Cited

U.S. PATENT DOCUMENTS 5,956,642 A 9/1999 Larsson et al.
7,620,021 B1 * 11/2009 Chen et al. .................... 370/337
(Continued)

FOREIGN PATENT DOCUMENTS

EP 1 722 512 A1 11/2006
WO WO 02/103920 A2 12/2002
(Continued)

OTHER PUBLICATIONS

Lucent Technologies, R1-063479: "Open Loop Vs. Closed Loop Inter-Cell Power Control Performance Comparison for the E-UTRA Uplink", 3GPP TSG-RAN WG1 #47, pp. 1-6, (2006).

(Continued)

*Primary Examiner* — Andrew Wendell
*Assistant Examiner* — Cindy Trandai
(74) *Attorney, Agent, or Firm* — Finnegan, Henderson, Farabow, Garrett & Dunner, L.L.P.

(57) ABSTRACT

A method for characterizing interference in a radio communication system including a plurality of user equipment communicating with transceiver stations, includes: determining quantities indicative of interference (attenuation or power) experienced by a transceiver station interfered by interfering user equipment; and exchanging between transceiver stations information based on these quantities and concerning interference from the interfering user equipment. In particular, the user equipment is in communication with respective serving transceiver stations, and exchanging includes sending from the serving transceiver stations to the interfered transceiver stations information concerning interference from user equipment served by the serving transceiver stations and interfering with the interfered transceiver stations. The method further includes grouping, by the serving transceiver station, the interfering user equipment according to a given grouping criterion in order to form groups thereof.

21 Claims, 2 Drawing Sheets

(56) References Cited

U.S. PATENT DOCUMENTS

| | | | |
|---|---|---|---|
| 7,848,285 B2 * | 12/2010 | Padovani et al. | 370/329 |
| 8,031,686 B2 * | 10/2011 | Li et al. | 370/342 |
| 8,086,258 B2 * | 12/2011 | Fujii et al. | 455/522 |
| 2002/0119781 A1 * | 8/2002 | Li et al. | 455/450 |
| 2002/0131376 A1 * | 9/2002 | Wheatley et al. | 370/328 |
| 2002/0155835 A1 * | 10/2002 | Pankaj et al. | 455/439 |
| 2003/0003906 A1 * | 1/2003 | Demers et al. | 455/424 |
| 2004/0252666 A1 * | 12/2004 | Johnson | 370/335 |
| 2006/0039318 A1 | 2/2006 | Oh et al. | |
| 2006/0092054 A1 | 5/2006 | Li et al. | |
| 2006/0155533 A1 | 7/2006 | Lin et al. | |
| 2006/0155534 A1 | 7/2006 | Lin et al. | |
| 2006/0161432 A1 | 7/2006 | Zhang et al. | |
| 2006/0165188 A1 | 7/2006 | Wunder et al. | |
| 2006/0270360 A1 | 11/2006 | Han et al. | |
| 2007/0026884 A1 * | 2/2007 | Rao | 455/522 |
| 2007/0183380 A1 * | 8/2007 | Rensburg et al. | 370/338 |
| 2008/0076438 A1 * | 3/2008 | Chang et al. | 455/452.2 |
| 2008/0144567 A1 * | 6/2008 | Agami et al. | 370/329 |

FOREIGN PATENT DOCUMENTS

| | | |
|---|---|---|
| WO | WO-2005/060132 A1 | 6/2005 |
| WO | WO-2005/125020 A1 | 12/2005 |
| WO | WO-2008/095543 A1 | 8/2008 |

OTHER PUBLICATIONS

"Physical Layer Aspects for Evolved Universal Terrestrial Radio Access (UTRA)", $3^{RD}$ Generation Partnership Project; Technical Specification Group Access Network, (Release 7); 3GPP TR 25.814, v7.1.0, pp. 1-132, (2006).

Seimens R3-06772, "Revised Text Proposal for TR R3.018 on RRM in LTE,", 3GPP TSG RAN WG3 Meeting #52, pp. 1-3, (2006).

Lucent Technologies, R1-063478:"Uplink Scheduling With Inter-Cell Power Control, With Extensions to Interference Coordination", 3GPP TSG-RAN WG1 #47, pp. 1-7, (2006).

International Search Report from the European Patent Office for International Application No. PCT/IT2007/000695 (May 19, 2008).

Thomas et al., "Feedback of Codebook Selection and MIMO Stream Power", IEEE 802.16 Broadband Wireless Access Working Group, pp. 1-7, (2004).

Barberis et al., "Characterization of Co-Channel Interference in a Wireless Communication System", U.S. Appl. No. 12/449,437, filed Aug. 7, 2009.

3rd Generation Partnership Project; Technical Specification Group Radio Access Network; "Evolved Universal Terrestrial Radio Access (E-UTRA) and Evolved Universal Terrestrial Radio Access Network (E-UTRAN); Overall description Stage 2", (Release 8) 3GPP TS 36.300 V0.34.1 0, pp. 75, (2007).

Notification of the Third Office Action in related Chinese Patent Application No. 200780052376.5, dated Jun. 5, 2013, 6 pages.

Notification of the Fourth Office Action in related Chinese Patent Application No. 200780052376.5, dated Feb. 26, 2014, 4 pages.

* cited by examiner

CHARACTERIZATION OF CO-CHANNEL INTERFERENCE IN A WIRELESS COMMUNICATION SYSTEM, IN PARTICULAR A CELLULAR RADIO COMMUNICATION SYSTEM

CROSS REFERENCE TO RELATED APPLICATION

This application is a national phase application based on PCT/IT2007/000695, filed Oct. 3, 2007, which claims the priority of PCT/EP2007/051302, filed Feb. 9, 2007.

TECHNICAL FIELD OF THE INVENTION

The present invention relates in general to wireless communication systems, and more specifically to co-channel interference characterization, feedback reduction and interference mitigation in cellular and non-cellular radio communication systems.

In particular, cellular radio communication systems where the present invention may find advantageous, but not limitative application, are for example the so-called beyond-3G ($3^{rd}$ Generation) cellular radio communication systems, i.e. new generation cellular radio communication systems having a wider transmission bandwidth than 3G cellular radio communication systems, such as for example those known as Third Generation Partnership Project Long Term Evolution (3GPP LTE) cellular radio communication systems.

Non-cellular radio communication systems where the present invention may find advantageous, but not limitative application are for example Wireless Local Area Networks (WLANs), and in particular WiMAX, which is defined as Worldwide Interoperability for Microwave Access by the WiMAX Forum, formed to promote conformance and interoperability of the IEEE 802.16 standard, officially known as WirelessMAN, and which is described by the Forum as "a standard-based technology enabling the delivery of last mile wireless broadband access as an alternative to cable and DSL".

BACKGROUND ART

Cellular phone systems and portable/mobile user equipments/terminals based on cellular radio communication have evolved in the past years from analogue, narrowband Frequency Division Multiple Access (FDMA) transmission ($1^{st}$ generation (1G) cellular radio communication systems), first to digital, narrowband Frequency and Time Division Multiple Access (FDMA/TDMA) transmission ($2^{nd}$ generation (2G) cellular radio communication systems), and later to digital, broadband Code Division Multiple Access (CDMA) transmission ($3^{rd}$ generation (3G) cellular radio communication systems).

Now, research is moving towards new generation cellular radio communication systems having a wider transmission bandwidth than 3G cellular radio communication systems, such as for example those known as 3GPP LTE cellular radio communication systems. When transmission bandwidth increases, transceivers typically show an increase in their circuit complexity, depending on the type of modulation and multiplexing used. When the bandwidth of the transmission systems becomes larger than a few MHz (about 10 MHz), a multi-carrier modulation is often more suitable to keep the transceivers circuit complexity as low as possible.

In particular, Orthogonal Frequency Division Multiplexing (OFDM) has proved to be particularly suited to use with cost-efficient transceivers that process signals in the frequency domain both on the transmitting and receiving sides. More in detail, OFDM is based upon the principle of frequency-division multiplexing (FDM), but is implemented as a digital modulation scheme. Specifically, the bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross-talk between the sub-channels is eliminated. This orthogonality occurs when sub-carriers are equally spaced by the symbol rate of a sub-carrier. The primary advantage of OFDM is its capability to cope with severe channel conditions—for example, multi-path and narrowband interference—without complex equalization filters. Channel equalization is simplified by using many slowly modulated narrowband signals instead of one rapidly modulated wideband signal. 3GPP LTE cellular radio communication systems adopt an OFDM-based physical layer. In particular the first one is expected to have an OFDM-based downlink and a Single-Carrier Frequency Division Multiple Access (SC-FDMA)-based uplink.

Outside the cellular radio communication systems, transceivers have evolved earlier towards large bandwidths. For example WLANs complying with the IEEE802.11 standards family use a 20 MHz channel, and transmit with a 64-subcarrier OFDM modulation. More specifically, in WLANs, transmission is governed by a Medium Access Control (MAC) protocol, called Carrier Sense Multiple Access with Collision Avoidance (CSMA-CA), that avoids transmission when a given frequency channel is already in use. For this reason, inside a given WLAN cell, there is usually no direct co-channel interference between different transceivers. Moreover, in a hot-spot kind of territory coverage, WLAN cells are usually physically separated, so that other-cell interference is largely limited in most cases. However, in 3GPP LTE cellular radio communication systems, OFDM is expected to work in a very different environment compared to WLANs. In fact, in a cellular radio communication system, where a continuous radio coverage is required, the signal transmitted by a transceiver station in downlink (DL) or by a terminal or user equipment (UE) in uplink (UL) can overlap the service area of neighbouring cells. Demands for high spectral efficiency, on the other hand, practically prevent the adoption of high frequency reuse like in 2G cellular radio communication systems, so that it is expected that for example in LTE radio communication systems the frequency reuse factor will be low, if not unitary. In LTE radio communication systems it is likely that especially at the cell edge very strong co-channel, intra-system interference will be present, substantially lowering user throughput, if not properly mitigated. Inter-cell interference can be mitigated by using for example Radio Resource Management (RRM) mechanisms (i.e. interference coordination) or layer-1 mechanisms, such as spatial suppression by means of multiple antennas and cancellation based on detection/subtraction of the inter-cell interference. A classification of these mechanisms can be found for example in 3GPP TR 25.814 "Physical layer aspect for evolved Universal Terrestrial Radio Access (UTRA)" sec. 7.1.2.6.

OBJECT AND SUMMARY OF THE INVENTION

The Applicant has noted that while in CDMA-based radio interfaces there is an intrinsic protection against inter-cell, intra-system interference, in LTE no direct protection embedded in the radio interface exists. Moreover, network architecture in LTE has been simplified in comparison with 3G, in that there is no RNC (Radio Network Controller), and many of the centralized functions which had been implemented in RNC have been de-centralized (distributed) in the Node Bs. Also RRM is included among those functions. As such, it is not expected to have in LTE a centralized control of interference coordination.

Applicant feels the need to provide a novel efficient interference coordination policy.

The main difference between inter-cell interference in the downlink and in the uplink is that, while in the downlink the sources of interfering signals are limited in number (the interfering Node Bs), in the uplink the number of interfering signal sources is as high as the user equipment count in the interfering cells. Such a potentially substantial number of interference sources implies that dealing separately with each source requires a very high signalling load and computation load.

Moreover, evolution of wireless communication systems, both cellular and non-cellular, is moving towards wider transmission bandwidth in order to provide heavier services in terms of computational and signalling load and engaged bandwidth, while radio cells will become smaller. Consequently interference in adjacent radio cells might increase both in downlink and in uplink thus resulting in the necessity of a more efficient power/interference control process.

The objective of the present invention is therefore to provide a methodology which can alleviate at least some of the above cited drawbacks, and in particular which allows uplink interference characterization to be performed with simple algorithms and light computational and signalling load.

This objective is achieved by the present invention in that it relates to a method for characterizing uplink interference in a radio communication system, a method for mitigating interference in a radio communication system, and a system and a computer program product configured to implement this interference characterization method, as defined in the appended claims.

The present invention achieves the aforementioned objective that each transceiver station, serving a plurality of served user equipments, is able to send to other neighbouring transceiver stations, experiencing uplink co-channel interference from these served user equipments, information concerning this interference. Therefore, each interfered transceiver station is able to characterize the uplink co-channel interference that it is experiencing based on the information received from neighbouring transceiver stations, and has the possibility to issue to the neighbouring transceiver stations requests in order to reduce the experienced interference (for example a request to lower the uplink power of interfering user equipments).

In particular, taking cellular radio communication systems in consideration, the present invention benefits from an interface provided between transceiver stations; for example, in the Third Generation Partnership Project Long Term Evolution an interface, commonly known as X2, is provided for allowing direct communications between node Bs.

Moreover, another aspect of the present invention is related to the reduction of signalling load between transceiver stations by grouping the user equipments served by a given transceiver station according to a given grouping criterion with respect to a given interfered neighbouring transceiver station, so that only the information concerning the uplink co-channel interference from each group or from a subset of all groups is signalled.

The present invention can be used advantageously to provide interference control to mitigation algorithms based on the knowledge of the influence that every interfering user equipment or group of user equipments produces on its neighbouring transceiver stations.

Furthermore, grouping of the user equipments in the characterization of the uplink co-channel interference allows to reduce the signalling load between transceiver stations.

Accordingly, the present invention provides an accurate characterization of co-channel uplink interference in a wireless communication system, which in turn allows to manage interference control and mitigation in a very efficient and performant way.

BRIEF DESCRIPTION OF THE DRAWINGS

For a better understanding of the present invention, preferred embodiments, which are intended purely by way of example and not to be construed as limiting, will now be described with reference to the attached drawings, wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached description and claims.

Additionally, in the following, without losing generality, specific reference will be made to a 3GPP LTE cellular radio communication system, remaining clear that the present invention can also be applied to other type of cellular or non-cellular systems such as WiMAX or WLANs. For this reason, when referring to a transceiver station being part of the network infrastructure, the terminology "Node B", that is the terminology commonly adopted in 3GPP cellular radio communication systems, will be used.

Figure 1:
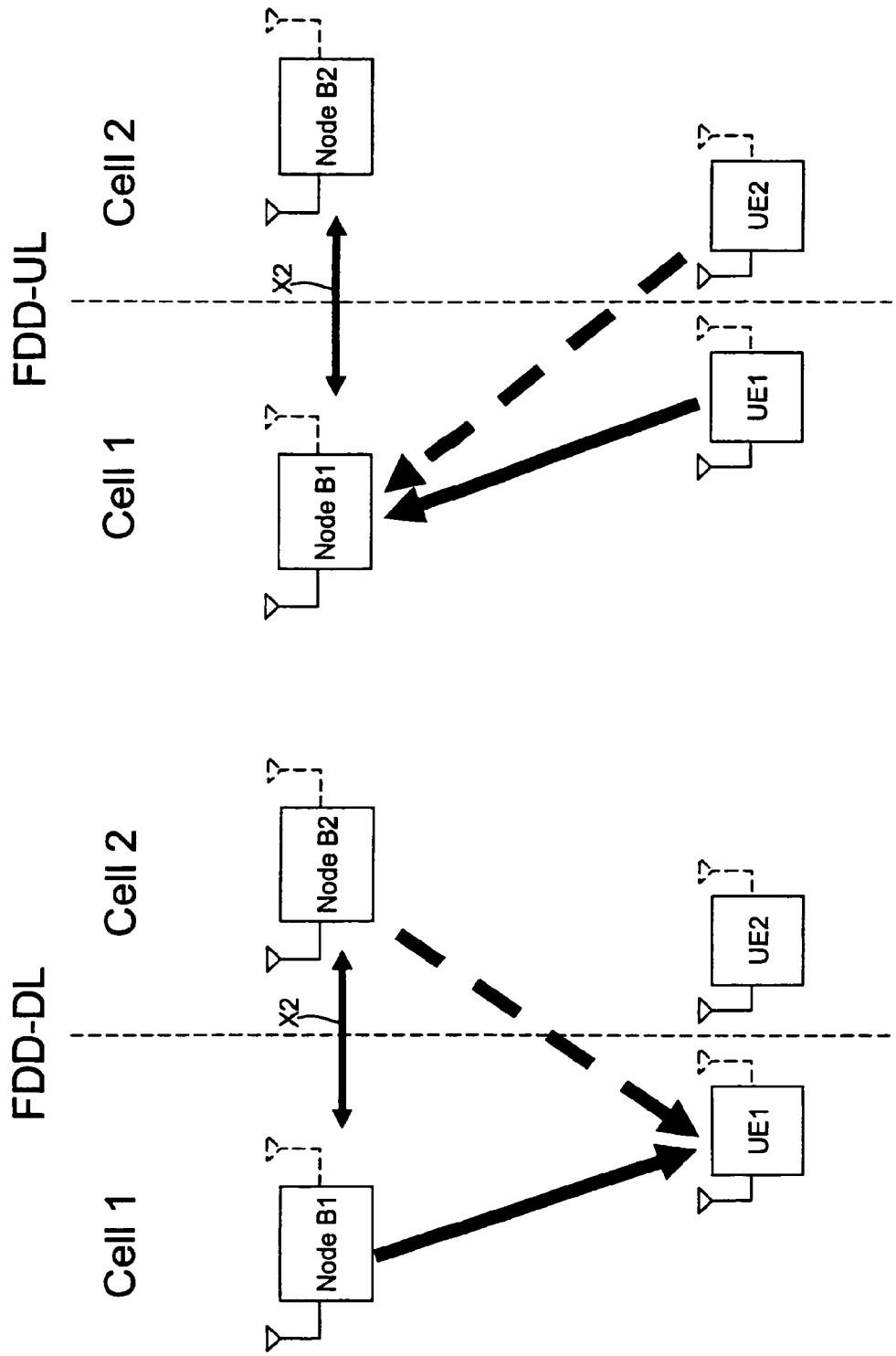
FIGS. 1a and 1b show schematically an FDD-DL and, respectively, an FDD-UL transmission case between two Node Bs of a cellular radio communication system and two user equipments each served by a respective Node B.

As an example, FIGS. 1a and 1b show schematically two Node Bs, designated by Node B1 and Node B2, of a 3GPP LTE cellular radio communication system, each serving a respective cell (designated by Cell 1 and Cell 2, respectively). FIGS. 1a and 1b further show two user equipments, designated by UE1 and UE2, and served by Node B1 and Node. B2, respectively. In particular, FIG. 1a shows an FDD-DL (Frequency Division Duplexing-Downlink) transmission case, while FIG. 1b shows a FDD-UL (Frequency Division Duplexing-Uplink) transmission case. Additionally, in both FIGS. 1a and 1b the solid lines represent useful signals, while the dashed lines represent inter-cell interference signals.

In the communication system under consideration, an assumption is made that an OFDMA-based downlink (DL) and an SC-FDMA-based uplink (UL) are adopted.

The present invention is equally applicable to systems that do, or do not, perform active interference control in the downlink. In case of systems performing downlink active interference control, the present invention is applicable independently of the chosen policy for downlink active interference control.

An example of downlink active interference control is disclosed in Applicant's international patent application PCT/EP07/51302 filed on Sep. 2, 2007. This document teaches to map and characterize the downlink interference situation inside a cell of the cellular radio communication system by using vector quantization and without using any information about the position of the user equipments.

In brief, each Node B (or a group of Node Bs) uses a codebook made up of codewords defined by respective representative vectors that represent and characterize, via vector quantization, any interference situation present in the cell served by the node B. Each codeword in the codebook is made up of a given number of components (or dimensions), each representing the interference power of a given interfering node B, and the values assumed by the codeword components at a certain time instant represent a point in a vector space whose dimensions are the interference powers. The number of components of each codeword is chosen so that all of the main interfering node Bs can be taken into account.

Specifically, as the overall OFDM spectrum is divided into sub-carrier blocks, or more specifically, subsets of one or more subcarriers for one or more consecutive OFDM symbols, generally referred to as Physical Resource Blocks (PRBs), the user equipments perform sets of interference measurements for each PRB.

In particular, the user equipments in a given cell send feedback messages to node B supervising the cell, the feedback messages containing the interference power in a given PRB that the user equipments in the cell receive from each one of the main interfering node Bs. Alternatively, the user equipments can send feedback messages containing attenuation values experienced by pilot signals from the main interfering node Bs in a given PRB. The capability to distinguish which one of the neighbouring cells interference comes from implies that each user equipment has knowledge of cell-specific training sequences (pilot signal sequences), while the capability to compute attenuations implies that each user equipment has knowledge of transmission powers of the pilot signal sequences. Based on the feedback messages, the codebook can evolve dynamically in time so as to ensure that, in every moment, the interference situation of the cell is represented with an acceptable quantization error.

The node B can choose one codeword to represent each one of the user equipments in the cell, and a codeword can also represent more than one user equipment.

Unlike downlink inter-cell interference, the uplink transmission of a given user equipment can be negatively influenced by the uplink transmission of user equipments in the neighbouring cells which transmit on the same PRB during overlapping time slots.

In the present invention the Applicant thus extends the downlink interference characterization and mitigation approach to the uplink, assuming that the same attenuation measurements that are useful for interference characterization in the downlink can be used for interference characterization in the uplink as well.

In particular, let us assume that with a certain time periodicity every Node B transmits a cell-specific pilot signals sequence:

$$T_i = \{\theta_1, \ldots, \theta_\tau\} \quad (1)$$

where τ is the sequence length.

Additionally, let us also assume that for a given UE there are Q interfering Node Bs, i.e. those Node Bs which use the same set or subset of frequency resources of the serving Node B and which can be considered as the potential main interferers for that UE, and that the considered UE has knowledge of the Q pilot signals sequences of those main interfering Node Bs. The UE will then be able to periodically measure the received power for each of the Q known pilot signals sequences.

The quantities measured by the UE take the form:

$$\phi_{nk} = \{p_1, \ldots, p_Q\} \quad (2)$$

where n is a time instant and k is an index identifying the UE. Moreover, let us assume that the measured powers are actually average powers over a given time duration.

Supposing that all Node Bs transmit the same pilot signal power, the vector of measured powers is inversely proportional to the long-term average attenuation experienced by the pilot signal of each interferer. In decibel, inversion becomes a change of sign:

$$A_{nk} = \{\pi_p + \eta - p_1, \ldots, \pi_p + \eta - p_Q\} = \{a_{k1}^{(n)}, \ldots, a_{kQ}^{(n)}\} \quad (3)$$

where $A_{nk}$ is the attenuation vector, $\pi_p$ represents pilot signal power at the transmit antenna, η is an optional term used for power normalization in the system, which might also take into account a possible power control mechanism on the pilot signal.

The k-th UE may periodically feedback the attenuation vector $A_{nk}$ to the serving Node B. The serving Node B can store the attenuation vector $A_{nk}$ as it is, or can apply to it a vector quantization process as described in the above referenced patent application PCT/EP07/51302.

Let us consider a Node B with index b which is suffering from inter-cell interference in the uplink (interfered Node B). Additionally, let us also consider one cell in the first or second tier of cells around the b-th Node B which is identified by the index i of its Node B, the i-th Node B serving the k-th user equipment (serving node B). According to what has been previously said, the i-th Node B has knowledge of the attenuation vector $A_{nk} = \{a_{k1}^{(n)}, \ldots, a_{kQ}^{(n)}\}$.

Assuming valid the principle of radio channel reciprocity, which assumption is valid in TDD and for FDD when uplink and downlink channels are not too distant in the frequency spectrum with respect to the carrier frequency, if the downlink radio signals experience a given long-term average attenuation when travelling from the b-th Node B to the k-th UE, it is also true that the uplink radio signals experience nearly the same long-term average attenuation when travelling from the k-th UE to the b-th Node B.

Additionally, if the b-th Node B is not included in the main interferers of the k-th UE (i.e. those belonging to the first and second tiers and experiencing an attenuation on the interfering signals below a given threshold), it is possible to safely assume that the k-th UE is irrelevant for inter-cell interference sustained by the uplink channel of the b-th Node B. Vice versa, if the b-th Node B is, included in the main interferers of the k-th UE, then the i-th Node B has knowledge of the average attenuation term $a_{kb}^{(n)}$.

According to the present invention, the i-th Node B sends to the b-th Node B, via an interface commonly known as X2 and provided in the Third Generation Partnership Project Long Term Evolution for allowing direct communications between Node Bs (see 3GPP TS 36.300) the value of $a_{kb}^{(n)}$ and the value of the average power transmitted by the k-th UE on each PRB. Consequently the b-th Node B can estimate the average uplink interference power due to the k-th UE on every PRB.

More in general, the b-th Node B can estimate the total long-term, average interference power on the m-th PRB in the uplink with the following computation (in logarithmic units):

$$\mu_{bm} = 10\log_{10} \sum_{i=1}^{Q} \sum_{k=1}^{U_i} 10^{\frac{\pi_{km,j} - a_{kb,j}}{10}} \quad (4)$$

where the time-dependency has been intentionally dropped in all the terms (index n). Expression (4) is computed over Q different cells: index i identifies the serving Node B of each of those cells, while index k identifies $U_i$ different UEs in the cell served by the i-th Node B, i.e. the i-th cell; $\pi_{km,i}$ is the average power that the k-th UE belonging to the i-th cell transmits on the m-th PRB; $a_{kb,i}$ is the average attenuation between the k-th UE belonging to the i-th cell and the b-th Node B. It's important to note that $a_{kb,i}$ does not depend on m because of averaging due to fading.

According to the present invention, the b-th Node B may issue to the i-th Node B via the X2 interface requests to reduce the uplink transmit power on given PRB(s). It is clear that the requests coming from the b-th Node B will be governed by a mechanism having the purpose of fairly utilizing the radio resources in the b-th cell and to maximize some performance parameter(s) in the same cell.

In turn, the i-th Node B collects the requests from the neighboring Node Bs and evaluates which requests to satisfy and which not according to an interference coordination algorithm, for example a vendor-specific algorithm.

The uplink co-channel interference control and mitigation method according to the present invention may cause a high amount of signalling on the X2 interface due to a high number of served UEs. In fact, a single cell may serve hundreds or even thousands of user equipments. Additionally, for each PRB in each cell it is possible in principle to have several users accessing the same resource in a Time Division Multiple Access (TDMA) fashion, and in Space Division Multiple Access (SDMA) fashion when uplink multi-user Multiple-Input and Multiple-Output (MIMO) is adopted. For this reason, it may be not practical to send to the neighbouring Node Bs the average attenuation and the average uplink transmitted power for each UE on each PRB.

Therefore, in order to reduce the signalling on the X2 interface, according to a further aspect of the present invention, it is proposed to group the UEs according to a given grouping criterion and then to send via the X2 interface to the neighbouring Node Bs information (e.g. the average attenuation and the average uplink transmitted power) for each group of user equipments on each PRB. In particular, with respect to the b-th interfered Node B, the user equipments in the cell served by the i-th Node B are divided into a set of R groups $G_{q,i}^{(b)}$ such that the union of these groups for $q=1, \ldots, R$ amounts to all the UEs in the cell:

$$\forall k, 1 \leq k \leq U_i, \exists q, k \in G_{q,i}^{(b)} \quad (5)$$

$$\forall b, \bigcup_{q=1}^{R} G_{q,j}^{(b)} \equiv \{1, \ldots, U_i\} \quad (6)$$

Equation (5) shows that the UEs belonging to the i-th cell are divided in different sets of groups depending on which interfered cell (the b-th cell) is considered.

Figure 2:
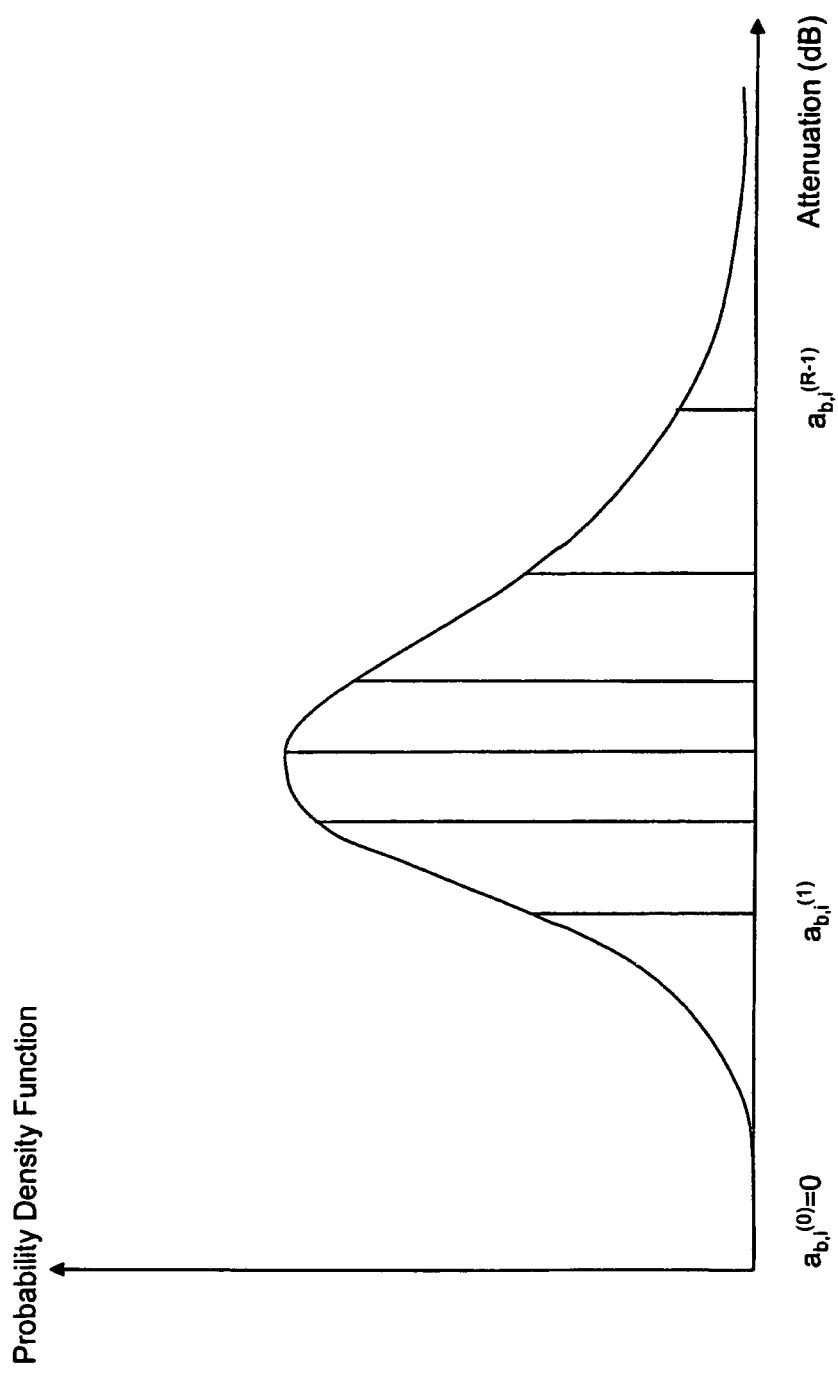
FIG. 2 shows a criterion for grouping user equipments according to an embodiment of the present invention.

A possible grouping criterion is based on the average attenuation experienced by the considered interfered Node Bs. According to this grouping criterion, firstly the number of groups R is decided and then the attenuation probability density function $f(a)=a_{kb,i}$ is computed and then sliced in R different areas; to each group are assigned the UEs whose $a_{kb,i}$ belongs to a certain area. For example, as showed in FIG. 2, the distribution function may be sliced in R equal areas. In formulas, the R areas are delimited by R+1 attenuation values as follows:

$$a_{b,i}^{(0)}=0 \leq a_{b,i}^{(1)} \leq \ldots \leq a_{b,i}^{(R-1)} \leq a_{b,i}^{(R)}=\infty \quad (7)$$

and then the grouping rule can be expressed as:

$$\forall k, 1 \leq k \leq U_i, a_{b,i}^{(q)} \leq a_{kb,i} < a_{b,i}^{(q+1)} \Leftrightarrow a_{kb,i} \in G_{q,i}^{(b)} \quad (8)$$

Alternatively, the grouping operation can be carried out via vector quantization. In this case a specific codebook for each set of groups is needed. Each codebook has R different codewords. The grouping rule is expressed as:

$$\forall k, 1 \leq k \leq U_i, VQ(a_{kb,i})=C_{q,i}^{(b)} \Leftrightarrow a_{kb,i} \in G_{q,i}^{(b)} \quad (9)$$

where VQ( ) indicates the vector quantization operation, $C_{q,i}^{(b)}$ is the q-th codeword in the codebook of the i-th cell, relative to the set of groups for the b-th cell.

With the adoption of user equipment grouping, the b-th Node B can estimate the total long-term average interference power on the m-th PRB in the uplink with an approximate computation which is a modification of equation (4):

$$\mu_{bm} = 10\log_{10} \sum_{i=1}^{Q} \sum_{q=1}^{R} 10^{\frac{\check{\pi}_{mq,j}^{(b)} - \check{a}_{q,j}^{(b)}}{10}} \quad (4')$$

where $\check{\pi}_{mq,i}^{(b)}$ is the total average power that the UEs belonging to the group $G_{q,i}^{(b)}$ transmit on the m-th PRB and $\check{a}_{q,i}^{(b)}$ is the average attenuation experienced between the UEs belonging to the group $G_{q,i}^{(b)}$ and the b-th Node B.

A further simplification is possible as follows:

$$\mu_{bm} = 10\log_{10} \sum_{i=1}^{Q} \max_{q} \left(10^{\frac{\check{\pi}_{mq,j}^{(b)} - \check{a}_{q,j}^{(b)}}{10}}\right) \quad (4'')$$

where for each interfering cell only the group that gives the maximum interfering power on the m-th PRB is considered for the computation.

Alternatively to the above expressions (8) and (9) it is possible to base the grouping operation on the difference of average transmitted power and attenuation, i.e. the interference power sustained by the victim Node B. In this case, since the transmitted power depends on the PRB, grouping becomes PRB-specific. For example, grouping rule (8) is modified in:

$$\forall k, 1 \leq k \leq U_i, \xi_{b,i}^{(q)} \leq \pi_{km,i} - a_{kb,i} < \xi_{b,i}^{(q+1)} \Leftrightarrow a_{kb,i} \in G_{q,i,m}^{(b)} \quad (8')$$

where quantities called $\xi$ delimit equal area slices (or areas defined by a given policy) in the probability density function of the average interference power received by the b-th Node B on the m-th PRB.

According to a further possibility, the i-th Node B selects for each PRB the UEs having the quantity $\pi_{km,i} - a_{kb,i}$ above a given threshold, and considers all of those UEs as belonging to the potential interferers for that PRB (with respect to the b-th Node B). The other UEs are considered as less influential in the interference characterization process and so are discarded (or forwarded to a secondary mechanism that takes into account lower-priority issues). Then we have:

$$\forall k, 1 \leq k \leq U_1, \pi_{km,i} - a_{kb,i} > \text{threshold} \iff a_{kb,i} \in G_{i,m}^{(b)} \quad (10)$$

where the index q is not present in $G_{i,m}^{(b)}$, denoting a reduction of R times in the number of groups compared to equation (8').

Once again, equations similar to (4') and (4") can be applied as well when grouping rule (10) is used. In this case the dependency on the index q is substituted with the dependency on the PRB index m.

While so far all the grouping criteria that have been described assume that the user equipments are selected as belonging or not belonging to a given group based on a single feature (e.g. a variable, such as $\pi_{km,i} - a_{kb,i}$), the grouping criteria may also be based on more than one variable. In particular, the user equipments can be grouped based both on a service type they are using (such as real-time, non-real-time, best effort, etc.) and on one of the variables described above, such as $\pi_{km,i} - a_{kb,i}$. Moreover, user equipments which operate in a certain time interval with a given service type may be grouped together.

If the interference coordination mechanism among the Node Bs operates only on certain types of service, and differently depending on the service type, it would then be more efficient to exchange through the X2 interface information related to groups of UEs that are using the same service type.

In any case, according to the present embodiment, the i-th Node B sends via the X2 interface to the b-th Node B data concerning the total uplink average interference power on the m-th PRB for each group or only for certain groups.

Finally, it is clear that numerous modifications and variants can be made to the present invention, all falling within the scope of the invention, as defined in the appended claims.

In particular, it may be appreciated that the present invention may also be theoretically applied to any wireless communication system; that it is equally applicable to systems that do or do not perform active interference control in the downlink; and that, in case of active downlink interference control, it is independent of the chosen policy for the downlink.

Moreover, other grouping criteria can be applied to the present invention without departing from the scope thereof, as defined in the appended claims.

Additionally, average attenuations may be computed directly by user equipments and then sent to the serving transceiver station, alternatively to being computed by the same serving transceiver station.

The invention claimed is:

1. A method for characterizing interference in a radio communication system comprising a plurality of user equipment configured to communicate with a plurality of transceiver stations, the method comprising:
   determining quantities indicative of interference experienced by a transceiver station interfered with by an interfering user equipment, wherein:
      the interfering user equipment is served by a serving transceiver station which is different from the interfered-with transceiver station; and
      the quantities indicative of interference comprise attenuations of signals experienced by pilot signals carrying cell-specific training sequences and propagating between the interfered-with transceiver station and the interfering user equipment;
   exchanging between the serving transceiver station and the interfered-with transceiver station information concerning interference from the interfering user equipment, wherein the information concerning interference includes the attenuations of signals and interfering transmission powers that the interfering user equipment uses to transmit, and wherein the exchanging includes sending the interfering transmission powers that the interfering user equipment uses to transmit from the serving transceiver station to the interfered-with transceiver station; and
   receiving, by the serving transceiver station, a request from the interfered-with transceiver station for reducing the interfering transmission powers that the interfering user equipment uses to transmit.

2. The method of claim 1, wherein determining quantities indicative of interference comprises measuring, by said interfering user equipment, at least one of powers or average powers of transceiver signals transmitted by the interfered-with transceiver station.

3. The method of claim 2, wherein said serving transceiver station is configured to communicate with said interfering user equipment in a frequency band which is organized into a plurality of physical resource blocks, and wherein measuring at least one of powers or average powers is performed by said interfering user equipment in one or more of the physical resource blocks.

4. The method of claim 2, wherein said attenuations of signals are determined based on:
   said measured at least one of powers or average powers; and
   transmission powers that the interfered-with transceiver station uses to transmit said transceiver signals.

5. The method of claim 4, wherein determining the attenuations of signals is performed by said interfering user equipment, and the method further comprises sending from said interfering user equipment to the serving transceiver station said determined attenuations of signals and interfering transmission powers that said interfering user equipment uses to transmit.

6. The method of claim 4, further comprising:
   sending from said interfering user equipment to the serving transceiver station, said measured at least one of powers or average powers and interfering transmission powers that said interfering user equipment uses to transmit; and
   wherein determining attenuations of signals is performed by said serving transceiver station.

7. The method of claim 1, wherein the radio communication system comprises a plurality of interfering user equipment interfering the interfered-with transceiver station, the method further comprising:
   grouping, by said serving transceiver station, the plurality of interfering user equipment according to a predetermined grouping criterion in order to form groups of said plurality of interfering user equipment, and
   wherein exchanging between the serving transceiver station and the interfered-with transceiver station comprises exchanging information concerning interference from said groups.

8. The method of claim 7, wherein the plurality of interfering user equipment interfere a plurality of transceiver stations and said grouping is performed based on one or more of the plurality of interfered-with transceiver stations.

9. The method of claim 7, further comprising:
   for each group, computing, by said serving transceiver station, a total average interfering transmission power based on interfering transmission powers that one or more interfering user equipment belonging to the group uses to transmit; and for each group, computing, by said serving transceiver station, a total average attenuation based on attenuations experienced by transmission signals propagating between one or more interfering user equipment belonging to the group and said interfered-with transceiver station.

10. The method of claim 9, further comprising:

sending from said serving transceiver station to said interfered-with transceiver station said total average interfering transmission power and said total average attenuation of one or more groups.

11. The method of claim 9, further comprising:

sending from said serving transceiver station to said interfered-with transceiver station a maximum value among ratios of total average interfering transmission powers of all groups and total average attenuations of all groups.

12. The method of claim 9, wherein the predetermined grouping criterion depends on attenuations experienced by transmission signals propagating between the plurality of interfering user equipment relative to said interfered-with transceiver station.

13. The method of claim 12, further comprising:

computing a distribution function of said attenuations experienced by the transmission signals propagating between the plurality of interfering user equipment relative to said interfered-with transceiver station;

dividing said distribution function into a predetermined number of areas; and assigning said plurality of interfering user equipment to said groups based on which area a corresponding attenuation belongs to.

14. The method of claim 12, further comprising:

associating a codebook with said serving transceiver station, the codebook comprising a predetermined number of codewords each representing a respective quantized value of attenuation;

identifying in the codebook, one or more codewords representative of ranges of attenuation; and assigning said plurality of interfering user equipment to said groups, based on the identified one or more codewords and corresponding ranges of attenuation, wherein the attenuations experienced by the transmission signals propagating between the plurality of interfering user equipment relative to said interfered-with transceiver station belong to the identified ranges of attenuation.

15. The method of claim 10, wherein grouping criterion is based on a difference between the interfering transmission power and an attenuation of said interfering user equipment.

16. The method of claim 10, wherein grouping criterion depends on a service type used by said interfering user equipment.

17. The method of claim 10, wherein grouping is performed according to two or more grouping criteria.

18. A radio communication system comprising a plurality of radio transceiver stations configured to communicate with a plurality of user equipment, the radio communication system comprising one or more processors configured to:

determine quantities indicative of interference experienced by a transceiver station interfered with by an interfering user equipment, wherein:

the interfering user equipment is served by a serving transceiver station which is different from the interfered-with transceiver station; and the quantities indicative of interference comprise attenuations of signals experienced by pilot signals carrying cell-specific training sequences and propagating between the interfered-with transceiver station and the interfering user equipment;

exchange between the serving transceiver station and the interfered-with transceiver station information concerning interference from the interfering user equipment, wherein the information concerning interference includes the attenuations of signals and interfering transmission powers that the interfering user equipment uses to transmit, and wherein the exchange includes sending the interfering transmission powers that the interfering user equipment uses to transmit from the serving transceiver station to the interfered-with transceiver station; and receive, by the serving transceiver station, a request from the interfered-with transceiver station for reducing the interfering transmission powers that the interfering user equipment uses to transmit.

19. A non-transitory computer readable medium encoded with a computer program product loaded in a memory of a processor of a radio transceiver station in a radio communication system and comprising software code portions for implementing, when the computer program product is run on the processor, an interference characterization method, the interference characterization method comprising:

determining quantities indicative of interference experienced by a transceiver station interfered with by an interfering user equipment, wherein:

the interfering user equipment is served by a serving transceiver station which is different from the interfered-with transceiver station; and the quantities indicative of interference comprise attenuations of signals experienced by pilot signals carrying cell-specific training sequences and propagating between the interfered-with transceiver station and the interfering user equipment;

exchanging between the serving transceiver station and the interfered-with transceiver station information concerning interference from the interfering user equipment, wherein the information concerning interference includes the attenuations of signals and interfering transmission powers that the interfering user equipment uses to transmit, and wherein the exchanging includes sending the interfering transmission powers that the interfering user equipment uses to transmit from the serving transceiver station to the interfered-with transceiver station; and receiving, by the serving transceiver station, a request from the interfered-with transceiver station for reducing the interfering transmission powers that the interfering user equipment uses to transmit.

20. The method of claim 1, further comprising:

mitigating interference, operating at a radio resource management level.

21. The method of claim 20, wherein mitigating interference comprises exchanging between transceiver stations requests for reduction of a transmission power of said interfering user equipment.

* * * * *